United States Patent [19]

Chin

[11] Patent Number: 5,015,362
[45] Date of Patent: May 14, 1991

[54] CATALYTIC CONVERSION OF $NO_x$ OVER CARBONACEOUS PARTICLES

[75] Inventor: Arthur A. Chin, Cherry Hill, N.J.

[73] Assignee: Mobil Oil Corporation, Fairfax, Va.

[21] Appl. No.: 458,053

[22] Filed: Dec. 28, 1989

[51] Int. Cl.$^5$ .............................................. C10G 11/18
[52] U.S. Cl. ............................. 208/121; 208/52 CT; 208/113; 208/149; 423/235; 423/239
[58] Field of Search ................. 208/52 CT, 113, 121, 208/120, 149; 423/235, 239

[56] References Cited

U.S. PATENT DOCUMENTS

| | | | |
|---|---|---|---|
| 4,060,589 | 11/1977 | Hass et al. | 423/244 R |
| 4,124,536 | 11/1978 | Itoh et al. | 502/244 R |
| 4,235,704 | 11/1980 | Luckenbach | 288/52 CT |
| 4,515,092 | 5/1985 | Walsh et al. | 110/347 |
| 4,789,531 | 12/1988 | Eichholtz et al. | 423/235 |
| 4,828,680 | 5/1989 | Green et al. | 208/149 |
| 4,847,054 | 7/1989 | Weisweiler | 502/21 |
| 4,855,116 | 8/1989 | Richter et al. | 423/239 |

Primary Examiner—Anthony McFarlane
Attorney, Agent, or Firm—Alexander J. McKillop; Charles J. Speciale; Richard D. Stone

[57] ABSTRACT

Oxides of nitrogen ($NO_x$) emissions are catalytically reduced by contacting a flue gas contain $NO_x$ with a carbonaceous substance, preferably sponge coke or coal, in the presence of a catalyst effective for promoting the reduction of $NO_x$ in the presence of such carbonaceous substances.

14 Claims, No Drawings

CATALYTIC CONVERSION OF $NO_x$ OVER CARBONACEOUS PARTICLES

BACKGROUND OF THE INVENTION

1. Field of the Invention

The invention relates to catalytic reduction of oxides of nitrogen, $NO_x$, in the presence of carbonaceous materials.

2. Description of Related Art

In Green et al, U.S. Pat. No. 4,828,680, which is incorporated herein by reference, the level of $NO_x$ emissions from a fluidized catalytic cracking (FCC) unit was reduced by incorporating carbonaceous particles such as sponge coke or coal into the circulating inventory of cracking catalyst. The carbonaceous particle performed several functions, selectively absorbing metal contaminants in the feed and also reducing $NO_x$ emissions in certain instances.

The patent included data showing that there was negligible reduction of NO by contact of flue gas with either clean sand or clean-burned FCC catalyst. Contacting a flue gas with coked FCC catalyst brought about a significant reduction in NO. Coked FCC catalyst, at 700° C., was able to reduce the NO concentration of an inlet gas mixture from 170 ppm NO to an NO concentration of 84 ppm, a reduction of 51%.

This patent also disclosed a two-stage FCC regenerator wherein flue gas from the second stage of regeneration contacted coked catalyst. The flue gas, containing $NO_x$ from producing a clean-burned catalyst in the second stage was treated by contact with fresh, spent catalyst added to the first stage.

I realized that the use of carbonaceous substances to react with $NO_x$-containing flue gases provided a powerful way to reduce $NO_x$ emissions. The only drawback to the approach was that the reduction was either slow or only moderately effective. In a properly designed FCC unit, such as that shown in U.S. Pat. No. 4,828,680, slow reaction of NO with carbonaceous materials is not a problem.

Significant $NO_x$ reductions can be achieved by allowing $NO_x$-containing flue gas to contact spent catalyst in a staged catalyst regeneration. However, the capital cost would be prohibitive unless a grass roots unit were involved.

I wanted a way to speed up the reaction of $NO_x$ with carbonaceous substances. This would permit greater reductions in $NO_x$ emissions to be achieved, or alternatively, allow smaller sized vessels to be used for the contact of $NO_x$-containing flue gas with carbonaceous materials.

I also wanted to have a process which could be used to clean up $NO_x$-containing flue gases from any source, not just for FCC units. Because of the widespread use of FCC units, I wanted a process which could be incorporated, at a minimal expense, into existing FCC units, making maximum use of presently installed equipment.

I discovered that the reduction of $NO_x$ emissions by contacting of a $NO_x$-containing gas stream with a carbonaceous substance could be improved by the addition of a $NO_x$ conversion catalyst. With the use of a $NO_x$ conversion catalyst, the process became one which could be used for stack gas cleanup in general, or for use in FCC units.

BRIEF SUMMARY OF THE INVENTION

Accordingly the present invention provides a process for reducing the nitrogen oxides ($NO_x$) content of a flue gas stream containing $NO_x$ produced by a combustion process comprising: removing said flue gas stream from said combustion process and then contacting, in a $NO_x$ reduction zone, said flue gas stream with a combustible carbonaceous substance and a catalytically effective amount of a catalyst effective for conversion of $NO_x$ to nitrogen in the presence of a combustible carbonaceous substance and reducing the content of $NO_x$ in said flue gas by catalytically reacting said $NO_x$ with said carbonaceous substance to produce a flue gas with a reduced content of $NO_x$.

In another embodiment the present invention provides in a fluid catalytic cracking process for nonhydrogenative cracking of hydrocarbons, which cracking process comprises cofeeding active hot solid zeolite cracking catalyst and crackable hydrocarbon feed to a cracking zone; cracking said feed to hydrocarbon products while depositing coke, nickel and vanadium on said catalyst; disengaging said coked catalyst to a regeneration zone; passing an oxygen-containing gas upwardly through said regeneration zone and at sufficient velocity to fluidize said catalyst contained therein; retaining said catalyst in said regeneration zone at a temperature and for a time sufficient to burn coke off said catalyst thereby heating and reactivating it and producing a flue gas comprising carbon and nitrogen oxides; returning said reactivated, heated catalyst to said cracking zone; at least intermittently removing an amount of a circulating inventory of said catalyst from said process and replacing it with fresh makeup catalyst; the improvement which comprises: adding to said circulating inventory of zeolite cracking catalyst separate particles of carbonaceous particles equal to about 0.1 to about 10.0 wt % of said circulating inventory and a catalytically effective amount of a catalyst effective for conversion of nitrogen oxides to nitrogen in the presence of said carbonaceous particles and reducing the content of nitrogen oxides in said flue gas by catalytically reacting said nitrogen oxides with said carbonaceous particles to produce a flue gas with a reduced content of nitrogen oxides.

In a more limited embodiment the present invention provides in a fluid catalytic cracking process for nonhydrogenative cracking of hydrocarbons, which cracking process comprises cofeeding active hot solid zeolite cracking catalyst that contains a Pt group metal CO-oxidation promoter and crackable hydrocarbon feed to a cracking zone; cracking said feed to hydrocarbon products while depositing coke, nickel and vanadium on said catalyst; disengaging said coked catalyst from said hydrocarbon products; passing said coked catalyst to a regeneration zone; passing an oxygen-containing gas upwardly through said regeneration zone at sufficient velocity to fluidize said catalyst contained therein; retaining said catalyst in said regeneration zone at a temperature and for a time sufficient to burn coke off said catalyst thereby heating and reactivating it and producing a flue gas comprising carbon and nitrogen oxides; returning said reactivated, heated catalyst to said cracking zone; concomitantly removing an amount of a circulating inventory of said catalyst from said process and replacing it with fresh makeup catalyst; the improvement which comprises: adding to said circulating inventory of zeolite cracking catalyst separate particles of sponge coke having a selectivity for vanadium, $K_v$ of at least about 10, said addition being effective to provide about 0.1 to about 10.0 weight percent of said sponge coke particles in said cracking zone and a catalytically effective amount of a catalyst effective for conversion of nitrogen oxides to nitrogen in the presence of said coke and reducing the content of nitrogen oxides in said flue gas by catalytically reacting said nitrogen oxides with said coke to produce a flue gas with a reduced content of nitrogen oxides.

DETAILED DESCRIPTION

The process of the present invention can be downstream of or be an integral part of combustion processes which generate $NO_x$-containing flue gas. The chemical and physical properties of suitable $NO_x$ conversion catalysts will be discussed. This is followed with a brief review of $NO_x$ generating combustion processes including a more detailed review of the FCC process because it is in cleanup of FCC flue gas that the process of the present invention excels.

$NO_x$ CATALYST

The process of the present invention can use any catalytic material which will promote the catalytic reduction of NO, $NO_2$, etc. in the presence of carbonaceous substances. The reaction mechanism is not completely understood, but it is believed that the $NO_x$ catalyst promotes some reaction between $NO_x$ and the carbonaceous substance.

The $NO_x$ reduction catalyst can be any material which has activity for promoting the reaction of $NO_x$ with carbonaceous solids. It is believed that any material which is effective for promoting catalytic reduction of NO with CO may also be used in the process of the present invention.

Bismuth and oxides and compounds thereof are effective and preferred as $NO_x$ reduction catalysts. Oxides of lanthanum and yttrium (Group IIIB) have also shown significant $NO_x$ reduction activity. The Group IVA and VA metals (Ge, Sn, Pb, Sb) all can be used as $NO_x$ reduction catalyst. Zinc compounds can also be used.

A simple screening test can be used in a laboratory to determine if a material has the desired $NO_x$ reduction properties, by passing an $NO_x$-containing flue gas through a fixed or fluidized bed of carbonaceous solids and analyzing the flue gas for $NO_x$ content.

The $NO_x$ reduction catalyst can, and preferably is, maintained in the form of a separate additive particle having similar properties to the carbonaceous solid present. It is also possible to deposit a suitable NO reduction catalyst on carbonaceous solids, either in situ or ex situ. In situ preparation of catalyst can be made by spraying a soluble or colloidally dispersed solution of, e.g., a bismuth compound, onto or through a bed of carbonaceous material. The carbonaceous material may be impregnated ex-situ with $NO_x$ reduction catalyst, or small amounts of the NO reduction catalyst can be physically incorporated into a portion of the carbonaceous material, or onto another porous support which need not be combustible. The $NO_x$ reduction catalyst can have the same particle size distribution as the carbonaceous solid, or may be made to the size desired. Conventional methods of catalyst formation may be used, such as, e.g., crushing the carbonaceous material, adding a matrix or binder, and spray drying, drilling, extruding, marumerizing, etc. to form a $NO_x$ reduction catalyst of the desired size.

When the $NO_x$ reduction catalyst is used as a pure, flue gas treatment process, the $NO_x$ reduction catalyst should be chosen for maximum effectiveness. When the $NO_x$ reduction catalyst is to be incorporated into the process unit producing the flue gas, the possible adverse effects of the $NO_x$ reduction catalyst on the process unit should be considered.

Use of a $NO_x$ reduction catalyst in a catalytic cracking unit presents the most difficult task. The $NO_x$ catalyst should be effective for $NO_x$ reduction, while having little or no adverse effect in the catalytic cracking reaction zone. A DeNO$_x$ catalyst can be used in an FCC unit in at least two ways: either by incorporating the $NO_x$ reduction catalyst on a support and/or in a manner where the reduction catalyst is isolated from the FCC reaction zone, or by using an $NO_x$ reduction catalyst which has little catalytic activity in the catalytic cracking reaction zone.

When using the preferred $NO_x$ reduction catalyst, based on bismuth, the amount of Bi present in the additive can vary from 0.5 to 90 wt %, on an elemental metal basis, but preferably the additive contains 1 to 20 wt % Bi, and most preferably 2 to 15 wt % Bi.

The Bi additive may comprise from 0.1 to 20 wt % of the equilibrium catalyst, and preferably comprises 0.2 to 10 wt %, and most preferably 0.5 to 5 wt % of the catalyst inventory.

The amount of Bi additive present may also be adjusted based on the amount of nitrogen in the feed, with 0.05 to 50 weights of Bi being present on catalyst per weight of feed nitrogen, and preferably 0.1 to 20 and most preferably 0.5 to 10 weights of Bi on catalyst per weight of feed nitrogen.

$NO_x$ GENERATING PROCESSES

The process of the present invention can be used to reduce $NO_x$ emissions from any source. $NO_x$ emissions are believed to be produced, to some degree, in every combustion process. In coal and oil burning power plants some $NO_x$ emissions are always formed. The problem is especially severe in brown coal combustion.

The process of the present invention is especially useful for reducing $NO_x$ emissions produced in the regenerator associated with a fluidized catalytic cracking unit. More details of the problem of $NO_x$ emissions from FCC regenerators, and the benefits of NO reduction via contact with carbonaceous particles are disclosed in U.S. Pat. No. 4,828,680 (Green et al) which has been incorporated herein by reference.

All approaches, pure flue gas treatment, FCC use with isolated $NO_x$ reduction catalyst, and FCC use with $NO_x$ catalyst circulating with the catalyst inventory, will be discussed in more detail hereafter.

FLUE GAS TREATMENT

The process of the present invention works well to clean up flue gas from any source. In this embodiment, the flue gas treatment is downstream, and remote from, the combustion process which generates the $NO_x$-containing flue gas.

The carbonaceous material is preferably disposed as the form of a fixed or fluidized or moving bed of carbonaceous solids through which the flue gas to be treated passes.

For simplicity, and when pressure drop is not a great concern, a simple fixed bed reactor design may be used with the catalyst disposed as a single or multiple fixed beds of catalyst. Radial flow fixed bed reactor designs will allow larger volumes of gas to be treated at lower pressure drop.

Use of fixed or moving bed of carbonaceous particle to contact $NO_x$-containing flue gas will frequently have the incidental benefit of acting as a particle trap to remove particulates which may be present in the flue gas.

Fluidized bed contacting devices are preferred for low pressure drop. A fixed, fluidized bed may be used wherein the relatively dense fluidized bed of carbonaceous solids is maintained and fluidized by the $NO_x$-containing gas. Alternatively, a dilute phase processing of the gas is also possible, with either an upflow or downflow operation contemplated.

Regardless of the type of bed (fixed bed, moving bed, fluidized bed) used to contain the carbonaceous solids, the carbonaceous solids should be intimately admixed with, or in close proximity to the $NO_x$ reducing catalyst.

FCC REGENERATOR USE—$NO_x$ CAT ISOLATED

The process of the present invention can be effectively used in any FCC regenerator without regard to possible adverse effects of the $DeNO_x$ catalyst in the FCC reactor, providing that the $NO_x$ reduction catalyst is used in a form and manner which keeps it out of the FCC reaction zone.

This can be done in several ways, some of which involve use of very small $NO_x$ reduction catalyst, and some of which involve use of relatively large, low density $NO_x$ reduction catalyst.

Disposing the $NO_x$ reduction catalyst on large, hollow spheres, will cause the $NO_x$ reduction catalyst to float to the top of a single, dense bed regenerator and tend to remain there. The particles are large and light and tend to float easily on the fluidized bed. They are not readily swept up into the dilute phase of the process so they tend to stay within the FCC regenerator.

An alternative approach, which may require some regenerator modification, is to dispose the $NO_x$ reduction catalyst on relatively small size particles, e.g., 10–40 micron size particles. These smaller sized particles can be retained, to a great extent, within the regenerator using the conventional cyclone separators. Because of their small size, they tend to segregate and collect in the upper portions of the FCC regenerator bed. It is possible, by supplying additional stages of cyclone separation, and selectively recycling the fines, from, e.g., the second or third stage cyclone to the upper portion of the catalyst bed in the regenerator, to cause a significant accumulation of $NO_x$ reduction catalyst in the upper portions of the bed.

More details about both approaches regards catalyst segregation are disclosed in U.S. Pat. No. 4,812,430 and U.S. Pat. No. 4,812,431, which are incorporated herein by reference.

FCC-CIRCULATING $NO_x$ CATALYST

It is also possible, and will be preferred in many instances, to practice the present invention using a $DeNO_x$ catalyst which is compatible with the catalytic cracking catalyst and circulates as an integral part of the FCC catalyst inventory. Usually such $DeNO_x$ catalysts will reduce $NO_x$ emissions somewhat by their mere presence. The addition of carbonaceous particles to the regenerator will then permit a further significant reduction in the $NO_x$ content of the regenerator flue gas.

An important consideration in this approach is to use a $DeNO_x$ catalyst which will cause no adverse reaction in the FCC reactor. This makes catalyst selection much harder, as compared to the pure flue gas treatment process where possible adverse effects of a $DeNO_x$ catalyst on the cracking process can be ignored. It also makes catalyst handling much simpler, because now the $DeNO_x$ catalyst can have physical properties which permit it to circulate with the catalyst inventory of an FCC unit.

The $NO_x$ reduction catalyst can be impregnated onto a portion of the circulating catalyst inventory, so long as the final form of the catalyst is one in which $NO_x$ reduction will be achieved when carbonaceous particles are added to the FCC regenerator.

Bismuth oxide compounds or bismuth oxides, on separate additive particles are especially preferred for use herein. These materials exhibit very little adverse effect in the cracking reactor. Separate particles of bismuth additive do very little in the cracking reactor. These bismuth additives do not passivate metals which may be present on the feed or in the catalyst. These bismuth additives have only a slight hydrogenation/dehydrogenation function which can usually be tolerated in most existing FCC units.

Not all forms of bismuth are suitable for use herein. Bismuth addition is currently practiced or proposed for metals passivation in FCC units. For metals passivation, a hydrocarbon soluble bismuth compound may be added to the feed to passivate nickel and vanadium compounds present in the feed or already deposited on the catalyst. Bismuth in such a form is believed to be effective at passivating nickel and vanadium, but such bismuth shows little or no $NO_x$ reduction capability.

Other $NO_x$ reducing additives which may be used in the circulating additive embodiment include oxides of lanthanum and yttrium (Group IIIB), the Group IVA and VA metals (Ge, Sn, Pb, Sb) and zinc and compounds of these elements.

CARBONACEOUS MATERIALS

Any carbonaceous material may be used provided it promotes the catalytic reduction of $NO_x$ in the presence of a $DeNO_x$ catalyst.

The term "carbonaceous material" as used herein means a combustible solid composed largely of carbon which may be associated with some hydrogen.

Such carbonaceous materials can be petroleum cokes, which are derived from liquid phase thermal pyrolysis of petroleum residues and heavy oils in commercial processes such as delayed coking, fluid coke, or Flexicoking; coals, including bituminous, sub-bituminous, and lignite; coal chars and cokes; biomass derived materials, including wood pyrolysis residues and charcoal; carbon blacks; and graphites. Spent or coked FCC catalyst may also be used.

To be used in the current process, such materials should be in the form of particles sized to 200 microns or less; preferably the particles have a size similar to that of the FCC catalyst particles. Coke from a delayed coker, coals, and biomass, for example, may be prepared by grinding and/or pulverizing, followed by screening or sizing using elutriation or other methods. The bulk density of the carbonaceous particles is typically in the range of 0.6 to 1.1 g/cc for most cokes and coals and ranges up to about 1.8 g/cc for some graphites. Surface areas of these particles are typically in the range of about 1 to 100 m$^2$/g.

As was noted in U.S. Pat. No. 4,828,680, carbonaceous solids vary in their selectivity vis-a-vis cracking catalyst for the selective sorption of vanadium, ranging from about equivalent to about 20-fold greater, or more, when measured as described in Example 1, of U.S. Pat. No. 4,828,680. The selectivity for vanadium sorption is defined by a partition coefficient, $K_v$, as follows:

$$K_v = \frac{\text{Concentration of Vanadium on Carbonaceous Solid}}{\text{Concentration of Vanadium on Cracking Catalyst}} \quad (\text{Eq. 1})$$

Preferential scavenging of vanadium by an added carbonaceous solids occurs when $K_v$ is 1 or greater, and this is very beneficial. It is also contemplated that scavenging of other metals such as nickel, for example, is also accomplished by the added carbonaceous solid as described by the method of this invention.

In general, it is preferred to use carbonaceous material that has a partition coefficient $K_v$ of at least about 1.5, and particularly preferred to use material with a $K_v$ of at least about 10. Sponge coke, which is a type of delayed coke, is a preferred carbonaceous solid, since it is a readily available and low valued refinery by-product having a $K_v$ greater than 10.

The separate particles of solid carbonaceous material is introduced into the circulating inventory at any convenient point, such as by adding the particles into the regenerator along with the fresh makeup cracking catalyst. Separate additive hoppers and feed mechanisms may be used to dispense the requisite amounts of additive into the flow of fresh makeup cracking catalyst before it enters the regenerator. Alternatively, the carbonaceous particles may be introduced into the system downstream of the primary combustion zone of the regenerator, for example, by adding them to the regenerated catalyst as it proceeds from the regenerator to the reactor. The carbonaceous particles may be introduced into the system on the reactor side by adding them directly to the FCC hydrocarbon feedstock. In this case, the particles are mixed and dispersed in the feed prior to the point where the feed is sprayed into the base of the reactor to mix with the incoming regenerated cracking catalyst. The carbonaceous particles are introduced into the system continuously or at convenient intervals. If introduced at intervals, the intervals should be sufficiently close as to avoid destabilizing the cracking and regeneration operation due to drastic changes of carbon content in the circulating inventory. The amount of carbonaceous material introduced is that sufficient to provide a steady state concentration of about 0.1 to about 10.0 wt % based on cracking catalyst in the cracking zone, with a preferred range of 0.5 to about 5.0 weight percent.

The carbonaceous particles may also be disposed as a separate fixed or fluidized bed downstream of the FCC or other process generating flue gas containing $NO_x$. In this type of operation, the metals scavenging ability of the carbonaceous particles is not important, because these particles never see the heavy hydrocarbon feed.

The following examples are provided to illustrate the $NO_x$ reducing effect of carbonaceous materials in the presence of a catalyst when used under simulated FCC regeneration conditions.

EXAMPLE 1

A bismuth-containing additive was prepared using the following procedure. An impregnation was prepared containing 2340 g $Bi(NO_3)_3 \cdot 5H_2O$, 847 grams concentrated (70%) $HNO_3$, and 3040 g $H_2O$. This was added to 4550 g of Davison Super-D matrix and the mixture agitated for 30 minutes. The slurry was filtered without washing, dried at 250° F., and calcined at 1200° F. for 2 hours. The finished additive contained 10.1 wt % Bi. Properties of the Super-D matrix and Bi additive are given in Table 1.

TABLE 1

| BISMUTH ADDITIVE PROPERTIES | | |
|---|---|---|
| | Super-D Matrix | Bi Prep |
| Physical | | |
| Real Density, g/cm$^3$ | 2.51 | 2.71 |
| Part Density, g/cm$^3$ | 1.51 | 1.71 |
| Pore Volume, cm2/g | 0.26 | 0.22 |
| Surface Area, m$^2$/g | 95 | 30 |
| Average Particle Size, microns | 82 | 84 |
| Chemical | | |
| SiO$_2$, wt % | 52 | |
| Al$_2$O$_3$, wt % | 29 | |
| Na, ppm | 490 | |
| Fe, ppm | 5400 | |
| Ni, ppm | 90 | |
| V, ppm | 60 | |
| Bi, wt % | — | 10.1 |

EXAMPLE 2

The ability of bismuth to enhance the rate of $NO_x$ reduction by contact with carbonaceous particles was tested under simulated FCC regeneration conditions using a bench-scale, fluidized bed reactor. 200 cc/min of a gas mixture, containing varying amounts of NO (balance $N_2$), was passed through a catalyst bed, containing 10 g of spent commercial FCC catalyst (properties of the clean burned catalyst are given in Table 2) and 0.5 g of the bismuth additive from Ex. 1, at 1300° F. To determine NO reduction, inlet and outlet $NO_x$ concentrations were measured using an Antek 703C chemiluminescent $NO_x$ analyzer. For comparison, identical runs, Runs 1-3, were made without additive.

TABLE 2

| Spent FCC Catalyst Properties | |
|---|---|
| Surface Area, M$^2$/g | 80 |
| Density, g/cc | |
| Packed | 0.92 |
| Loose | 0.85 |
| Carbon, wt % | 0.74 |
| Al$_2$O$_3$, wt % | 46 |
| Nitrogen, ppm | 190 |
| Sulfur, wt % | <0.005 |
| Nickel, ppm | 3200 |
| Vanadium, ppm | 590 |
| Copper, ppm | 43 |
| Iron, ppm | 9500 |
| Sodium, ppm | 2800 |
| Platinum, ppm | 0.43 |

TABLE 3

Effect of Bismuth on $NO_x$ Reduction by Coke

| | NO Concentration, ppm | | |
|---|---|---|---|
| Run # | Inlet | Outlet | % Reduction |
| No additive: | | | |
| 1 (Prior Art) | 297 | 104 | 65 |
| 2 (Prior Art) | 391 | 154 | 61 |
| 3 (Prior Art) | 755 | 312 | 59 |
| 5% Bi additive: | | | |
| 4 | 252 | 9 | 97 |
| 5 | 366 | 50 | 86 |

TABLE 3-continued

Effect of Bismuth on $NO_x$ Reduction by Coke

| | NO Concentration, ppm | | |
|---|---|---|---|
| Run # | Inlet | Outlet | % Reduction |
| 6 | 618 | 59 | 90 |

Table 3 shows the effectiveness of coke, on spent catalyst, alone, and with my bismuth additive, at reducing $NO_x$ emissions. The tests reported in runs 1–3 show the beneficial results that could be achieved in practicing the invention in U.S. Pat. No. 4,828,680. The tests reported in runs 4–6, with my preferred catalyst, a bismuth additive, show how the effectiveness of carbonaceous materials at reducing $NO_x$ emissions can be greatly enhanced by the presence of a $NO_x$ reduction catalyst.

I claim:

1. A process for reducing the nitrogen oxides ($NO_x$) content of a flue gas stream containing $NO_x$ produced by a combustion process comprising:
   (a) removing said flue gas stream from said combustion process,
   (b) contacting, in a $NO_x$ reduction zone, said flue gas stream with a combustible carbonaceous substance and an amount of a NOx reduction catalyst comprising bismuth or oxides of bismuth effective for conversion of $NO_x$ to nitrogen in the presence of a combustible carbonaceous substance and reducing the content of $NO_x$ in said flue gas by catalytically reacting said $NO_x$ with said carbonaceous substance to produce a flue gas with a reduced content of $NO_x$.

2. The process of claim 1 wherein the $NO_x$ reduction zone operates at a temperature of 900 to 1900 F.

3. The process of claim 1 wherein the carbonaceous substance is selected from the group comprising coke, coal and coke on spent fluidized catalytic cracking catalyst.

4. The process of claim 1 wherein the carbonaceous substance is disposed as a fixed or moving bed of particulates and the flue gas passes through the bed at a gas hourly space velocity of 100 to 10,000/hour.

5. The process of claim 4 wherein the carbonaceous substance is present in the form of solid particles having an average particle diameter of about 1/16 to ½ inch.

6. The process of claim 1 wherein the carbonaceous substance is present as a dense or dilute phase fluidized bed and the flue gas passes through the bed at a gas hourly space velocity of 100 to 10,000/hour.

7. In a fluid catalytic cracking process for nonhydrogenative cracking of hydrocarbons, which cracking process comprises cofeeding a supply of an active, hot, regenerated solid zeolite cracking catalyst and crackable hydrocarbon feed to a cracking zone; cracking said feed to produce cracked hydrocarbon products and deposit coke, nickel and vanadium on said catalyst and produce coked catalyst; disengaging said coked catalyst from said cracked products, stripping coked catalyst by contact with a stripping gas in a stripping means to produce a stripped catalyst, charging said stripped catalyst to a regeneration zone; passing an oxygen-containing gas upwardly through said regeneration zone in an amount and at sufficient velocity to fluidize said catalyst contained therein; retaining said catalyst in said regeneration zone at a temperature and for a time sufficient to burn coke off said catalyst thereby heating and regenerating it and producing a flue gas comprising carbon and nitrogen oxides; recycling said regenerated, heated catalyst to said cracking zone; at least intermittently removing an amount of a circulating inventory of said catalyst from said process and replacing it with fresh makeup catalyst; the improvement which comprises:
   adding to said circulating inventory of zeolite cracking catalyst separate particles of carbonaceous particles equal to about 0.1 to about 10.0 wt % of said circulating inventory and an amount of a NOx reduction catalyst comprising bismuth or oxides of bismuth effective for conversion of nitrogen oxides to nitrogen in the presence of said carbonaceous particles and reducing the content of nitrogen oxides in said flue gas by catalytically reacting said nitrogen oxides with said carbonaceous particles to produce a flue gas with a reduced content of nitrogen oxides.

8. The process of claim 7 wherein said nitrogen oxides conversion catalyst circulates with said circulating cracking catalyst inventory.

9. The process of claim 7 wherein said regeneration means contains at least one dense phase, bubbling fluidized bed of cracking catalyst, said cracking catalyst comprises particles of cracking catalyst having a settling velocity in said regenerator and said nitrogen oxides conversion catalyst has a lower settling velocity than the settling velocity of said cracking catalyst and said nitrogen oxides conversion catalyst segregates in said regenerator dense bed and rises to an upper portion of said dense bed in said regenerator.

10. The process of claim 7 wherein said regeneration means contains at least one dense phase, bubbling fluidized bed of cracking catalyst, said cracking catalyst comprises particles of cracking catalyst having an average particle diameter within the range of 45 to 90 microns and a bulk density and said nitrogen oxides conversion catalyst is disposed on a hollow support having a larger diameter than said cracking catalyst and a lower bulk density than said cracking catalyst and said nitrogen oxides conversion catalyst segregates in said regenerator dense bed and floats on top of said dense bed in said regenerator.

11. In a fluid catalytic cracking process for nonhydrogenative cracking of hydrocarbons, which cracking process comprises cofeeding active hot solid zeolite cracking catalyst that contains a Pt group metal CO-oxidation promoter and crackable hydrocarbon feed to a cracking zone; cracking said feed to hydrocarbon products while depositing coke, nickel and vanadium on said catalyst; disengaging said coked catalyst from said hydrocarbon products; passing said coked catalyst to a regeneration zone; passing an oxygen-containing gas upwardly through said regeneration zone at sufficient velocity to fluidize said catalyst contained therein; retaining said catalyst in said regeneration zone at a temperature and for a time sufficient to burn coke off said catalyst thereby heating and reactivating it and producing a flue gas comprising carbon and nitrogen oxides; returning said reactivated, heated catalyst to said cracking zone; concomitantly removing an amount of a circulating inventory of said catalyst from said process and replacing it with fresh makeup catalyst; the improvement which comprises:
   adding to said circulating inventory of zeolite cracking catalyst separate particles of sponge coke having a selectivity for vanadium, $K_v$, of at least about 10, said addition being effective to provide about 0.1 to about 10.0 weight percent of said sponge coke particles in said cracking zone and an amount of a NOx reduction catalyst comprising bismuth or oxides of bismuth effective for conversion of nitrogen oxides to nitrogen in the presence of said coke and reducing the content of nitrogen oxides in said flue gas by catalytically reacting said nitrogen oxides with said coke to produce a flue gas with a reduced content of nitrogen oxides.

12. The process of claim 11 wherein less than about 2 volume percent oxygen is present in the flue gas from said regeneration zone.

13. The process of claim 11 wherein said regenerator comprises a multi-stage regenerator and at least the last regeneration stage operates in a full CO-combustion mode whereby producing a flue gas having a $CO_2/CO$ ratio greater than 10.

14. The process of claim 11 wherein the $NO_x$ reduction catalyst comprises oxides of bismuth and is present in an amount equal to 0.01 to 10 wt % of said cracking catalyst inventory, on an elemental bismuth basis.

* * * * *